United States Patent
Narang et al.

(10) Patent No.: US 8,798,619 B2
(45) Date of Patent: Aug. 5, 2014

(54) METHOD AND APPARATUS FOR PERFORMING INTER-SYSTEM SEARCHES IN IDLE MODE

(75) Inventors: Mohit Narang, Escondido, CA (US); Ali Taha, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 926 days.

(21) Appl. No.: 12/050,278

(22) Filed: Mar. 18, 2008

(65) Prior Publication Data

US 2008/0233955 A1  Sep. 25, 2008

Related U.S. Application Data

(60) Provisional application No. 60/895,870, filed on Mar. 20, 2007.

(51) Int. Cl.
H04W 4/00 (2009.01)
(52) U.S. Cl.
USPC .......................................................... 455/434
(58) Field of Classification Search
CPC .......................... H04W 36/0083; H04W 48/16
USPC .............. 455/435.2, 436, 439, 524, 437, 434, 455/423, 456.4, 403, 62, 435.1, 411, 422.1; 370/203, 335, 331
See application file for complete search history.

(56) References Cited

U.S. PATENT DOCUMENTS

| | | | |
|---|---|---|---|
| 5,794,146 A | 8/1998 | Sevcik et al. | |
| 6,807,163 B1 | 10/2004 | Shi | |
| 7,215,956 B2 | 5/2007 | Liu et al. | |
| 7,236,806 B2 | 6/2007 | Chang | |
| 7,460,869 B2 | 12/2008 | Pekonen et al. | |
| 7,627,318 B2 * | 12/2009 | Yasuda | 455/436 |
| 2002/0082010 A1 | 6/2002 | Koorapaty et al. | |

(Continued)

FOREIGN PATENT DOCUMENTS

| | | |
|---|---|---|
| CN | 1503592 A | 6/2004 |
| EP | 1424862 | 6/2004 |

(Continued)

OTHER PUBLICATIONS

Partial International Search Report—PCT/US08/057753, International Search Authority—European Patent Office, Sep. 16, 2008.

(Continued)

*Primary Examiner* — Kiet Doan
(74) *Attorney, Agent, or Firm* — Rupit M. Patel (57) ABSTRACT

Techniques for performing searches by a user equipment (UE) are described. The UE may camp on a serving cell for a first radio access technology (RAT) (e.g., GSM) and may periodically perform searches for a second RAT (e.g., WCDMA). In an aspect, the UE may vary the rate of searches for the second RAT based on received signal levels for the first and second RATs. The UE may determine a difference between the received signal levels for the two RATs, compare the difference against at least one threshold, and select a search rate associated with a range within which the difference falls as the rate of searches for the second RAT. In another aspect, the UE may control certain aspects of searches (e.g., determine whether or not to perform searches or the rate of searches) for the second RAT by considering the frequency bands for the two RATs.

26 Claims, 5 Drawing Sheets (56) References Cited

U.S. PATENT DOCUMENTS

| | | |
|---|---|---|
| 2004/0023634 A1* | 2/2004 | Jeong et al. .................... 455/403 |
| 2004/0090929 A1 | 5/2004 | Laux et al. |
| 2004/0106401 A1 | 6/2004 | Ormson |
| 2005/0202828 A1 | 9/2005 | Pecen et al. |
| 2005/0221824 A1* | 10/2005 | Lee et al. .................... 455/435.2 |
| 2007/0091785 A1* | 4/2007 | Lindoff et al. ................ 370/203 |
| 2008/0064399 A1* | 3/2008 | Lin .............................. 455/436 |

FOREIGN PATENT DOCUMENTS

| | | |
|---|---|---|
| EP | 1681893 | 7/2006 |
| EP | 1744573 | 1/2007 |
| JP | 2001069063 A | 3/2001 |
| JP | 2004180297 A | 6/2004 |
| JP | 2004356684 A | 12/2004 |
| JP | 2006279121 A | 10/2006 |
| JP | 2007274152 A | 10/2007 |
| KR | 20060101515 A | 9/2006 |
| WO | 9512932 | 5/1995 |
| WO | 2006077647 A1 | 7/2006 |
| WO | 2007023249 | 3/2007 |

OTHER PUBLICATIONS

International Search Report—PCT/US2008/057753—International Search Authority—European Patent Office, Dec. 12, 2008.
Written Opinion—PCT/US2008/057753—International Search Authority—European Patent Office, Dec. 12, 2008.
Taiwan Search Report—TW097109934—TIPO—Aug. 17, 2011.

* cited by examiner

METHOD AND APPARATUS FOR PERFORMING INTER-SYSTEM SEARCHES IN IDLE MODE

CLAIM OF PRIORITY UNDER 35 U.S.C. §119

The present application for patent claims priority to Provisional U.S. Application Ser. No. 60/895,870, entitled "INCREASING UMTS STANDBY TIME BY REDUCING THE NUMBER OF WCDMA SEARCHES WHEN UE IS IN GSM IDLE MODE," filed Mar. 20, 2007, assigned to the assignee hereof, and expressly incorporated herein by reference.

BACKGROUND

I. Field

The present disclosure relates generally to communication, and more specifically to techniques for performing searches for wireless communication systems.

II. Background

Wireless communication systems are widely deployed to provide various communication services such as voice, video, packet data, messaging, broadcast, etc. These systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A user equipment (UE), which may be a cellular phone or some other device, may be able to communicate with wireless communication systems of different radio access technologies (RATs). For example, the UE may support Global System for Mobile Communications (GSM) and Wideband CDMA (WCDMA), which are two widely deployed RATs. Upon powered up or lost of coverage, the UE may search for suitable cells from which the UE can receive communication service. The term "cell" can refer to a base station and/or the coverage area of the base station, depending on the context in which the term is used. If a suitable cell is found, then the UE may perform registration with the cell, if necessary. The UE may then "camp" on the cell if the UE is in an idle mode and not actively communicating with the cell. The cell on which the UE is camped is referred to as the serving cell.

While camped on the serving cell, the UE may periodically search for better cells in the same system or another system. If a better cell is found, then the UE may select the better cell as a new serving cell via a process commonly referred to as cell reselection. The searches performed in the idle mode may allow the UE to camp on the best possible cell even if channel conditions change, e.g., if the UE moves to a new location. This may then allow the UE to reliably receive incoming paging messages and initiate or receive calls.

The searches for better cells while in the idle mode may be beneficial in many instances. However, these searches consume battery power of the UE, which may then shorten standby time in the idle mode. There is therefore a need in the art for techniques to efficiently perform searches while in the idle mode.

SUMMARY

Techniques for performing searches in a manner to reduce power consumption and extend standby time for a UE are described herein. The UE may camp on a serving cell for a first RAT (e.g., GSM) and may periodically perform searches for a second RAT (e.g., WCDMA) to find a better cell.

In an aspect, the UE may vary the rate of searches for the second RAT based on received signal levels for the first and second RATs. In one design, the UE may determine a difference between the received signal level for the first RAT and the received signal level for the second RAT. The UE may then determine the rate of searches for the second RAT based on this difference. The UE may compare the difference against at least one threshold for multiple ranges, with each range being associated with a different search rate. The UE may then select the search rate associated with the range within which the difference falls as the rate of searches for the second RAT. The UE may select the fastest rate among all possible rates if the received signal level for the first RAT is below a low threshold.

In another aspect, the UE may control certain aspects of searches for the second RAT by considering frequency bands for the two RATs. Cells for the first and second RATs may be co-located at the same cell sites, and the path loss for cells operating on a higher frequency band may be higher than the path loss for cells operating on a lower frequency band. In one design, the UE may determine a factor indicative of the difference between the path loss for the first RAT and the path loss for the second RAT based on the frequency bands for the two RATs. The UE may then estimate the received signal level for the second RAT based on the received signal level for the first RAT and the factor. The UE may use the estimated received signal level for the second RAT to determine whether or not to perform searches for the second RAT, the rate of searches for the second RAT, which frequency band(s) to perform searches for the second RAT, etc.

Various aspects and features of the disclosure are described in further detail below.

DETAILED DESCRIPTION

The search techniques described herein may be used for various wireless communication systems such as CDMA, TDMA, FDMA, OFDMA and SC-FDMA systems. The terms "system" and "network" are often used interchangeably. A CDMA system may implement a RAT such as Universal Terrestrial Radio Access (UTRA), cdma2000, etc. The terms "radio access technology", "RAT", "radio technology", and "air interface" are often used interchangeably. UTRA includes WCDMA and other variants of CDMA. cdma2000 covers IS-2000, IS-95 and IS-856 standards. A TDMA system may implement a RAT such as GSM. An OFDMA system may implement a RAT such as Evolved UTRA (E-UTRA), Ultra Mobil Broadband (UMB), IEEE 802.16, IEEE 802.20, Flash-OFDM®, etc. UTRA and E-UTRA are part of Universal Mobile Telecommunication System (UMTS). Long Term Evolution (LTE) is an upcoming release of UMTS utilizing E-UTRA. GSM, UTRA, E-UTRA, UMTS and LTE are described in documents from an organization named "3rd Generation Partnership Project" (3GPP). cdma2000 and UMB are described in documents from an organization named "3rd Generation Partnership Project 2" (3GPP2). These various RATs and standards are known in the art.

For clarity, various aspects of the techniques are described below for a UE supporting GSM and WCDMA. The terms "WCDMA" and "UMTS" are often used interchangeably. GSM is a second-generation (2G) RAT that can provide voice service and low to medium rate packet data service. WCDMA is a third-generation (3G) RAT that can provide enhanced services and capabilities, e.g., higher data rates, concurrent voice and data calls, etc. A network operator/service provider may deploy GSM and WCDMA with overlapping coverage areas.

Figure 1:
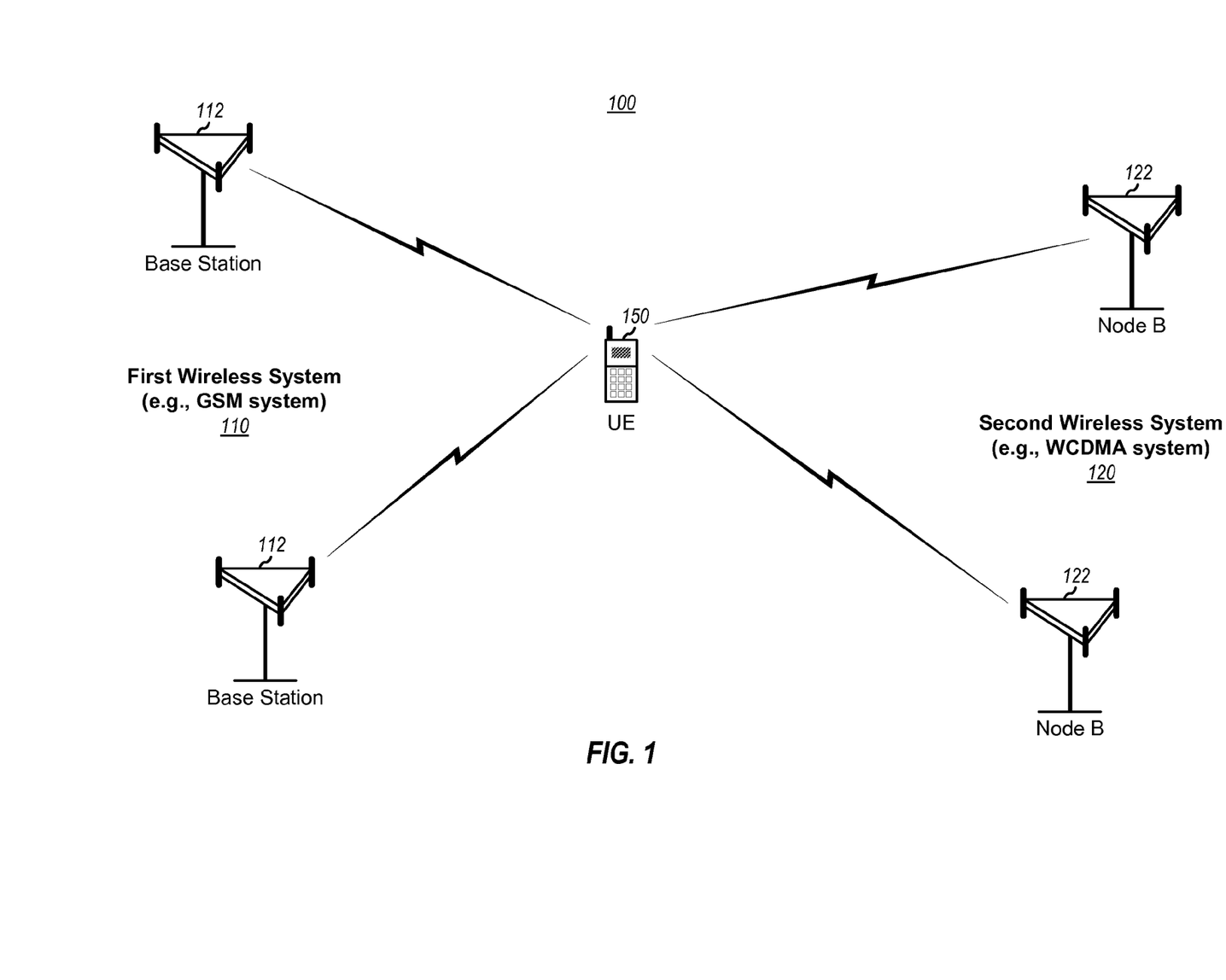
FIG. 1 shows a deployment of two wireless communication systems.

FIG. 1 shows a deployment 100 of a first wireless system 110 and a second wireless system 120. In general, systems 110 and 120 may utilize any two different RATs. For clarity, much of the description below assumes that system 110 is a GSM system and system 120 is a WCDMA system. GSM system 110 and WCDMA system 120 may be part of a public land mobile network (PLMN) and may have overlapping coverage areas.

GSM system 110 includes base stations 112 that communicate with UEs within the coverage area of the GSM system. WCDMA system 120 includes Node Bs 122 that communicate with UEs within the coverage area of the WCDMA system. Base stations 112 and Node Bs 122 are generally fixed stations that communicate with the UEs and may also be referred to by other names such as evolved Node Bs, access points, etc. In the following description, base stations 112 may also be referred to as GSM cells, and Node Bs 122 may also be referred to as WCDMA cells.

A UE 150 may be able to communicate with GSM system 110 and WCDMA system 120, typically with one system at any given moment. This capability may allow a user to obtain the performance advantages of WCDMA and the coverage benefits of GSM with the same UE. UE 150 (WCDMA terminology) may be stationary or mobile and may also be referred to as a mobile station (GSM terminology), a terminal, an access terminal, a mobile equipment, a subscriber unit, a station, etc. UE 150 may be a cellular phone, a personal digital assistant (PDA), a wireless device, a wireless modem, a handheld device, a laptop computer, etc.

The GSM and WCDMA systems may each operate on one or more frequency channels within a frequency band. Table 1 lists some frequency bands that are commonly used for GSM and WCDMA. Other frequency bands may also be used for GSM and WCDMA. The cellular and PCS bands are commonly used in the United States, and the IMT-2000 and GSM 1800 bands are commonly used in Europe.

TABLE 1

| Frequency Band | Frequency Band | Uplink (MHz) | Downlink (MHz) | Common Name |
|---|---|---|---|---|
|  | UMTS Band I | 1920-1980 | 2110-2170 | IMT-2000 |
| GSM 1900 | UMTS Band II | 1850-1910 | 1930-1990 | PCS |
| GSM 1800 | UMTS Band III | 1710-1785 | 1805-1880 | DCS |
|  | UMTS Band IV | 1710-1770 | 2110-2170 |  |
| GSM 850 | UMTS Band V | 824-849 | 869-894 | Cellular |
|  | UMTS Band VI | 830-840 | 875-885 |  |
| GSM 900 |  | 890-915 | 935-960 |  |

The GSM system may operate on any one of the frequency bands in Table 1 or some other frequency band, which may be collectively referred to as GSM bands. Each GSM band covers a number of 200 KHz radio frequency (RF) channels. Each RF channel is identified by a specific ARFCN (absolute radio frequency channel number). The RF channels may also be referred to as GSM channels and frequency channels. The GSM system may operate on a specific set of RF channels in a specific GSM band.

The WCDMA system may operate on any one of the frequency bands in Table 1 or some other frequency band, which may be collectively referred to as UMTS bands. Each UMTS band may cover a number of UMTS channels that may be spaced apart by approximately 5 MHz. Each UMTS channel has a bandwidth of 3.84 MHz and a center frequency that is given in 200 KHz resolution. Each UMTS channel is identified by a specific channel number, which may be a UARFCN (UTRA ARFCN). The UMTS channels may also be referred to as WCDMA channels, UTRAN frequencies, frequency channels, etc. The WCDMA system may operate on one or more specific UARFCNs.

The UE may search for systems upon power up. If a system is found, then the UE may operate in either (i) a connected mode and actively communicate with the system to obtain service or (ii) an idle mode and camp on the system if communication is not required. The UE may periodically search for better cells while in the idle mode.

The UE may perform a GSM search for a frequency band, as follows:

Perform a power scan and measure the received signal level of each GSM channel in the frequency band,
Identify strong GSM channels,
Attempt acquisition on each strong GSM channel, and
Report a list of acquired GSM channels.

The UE may obtain a received signal level for each GSM channel in the frequency band from the power scan. The terms "received signal level", "received signal strength", "received signal strength indicator", "RSSI", "received power", "receive signal code power", and "RSCP" may be used interchangeably. The UE may select strong GSM channels (e.g., those with received signal levels above a detection threshold) for acquisition and may discard the remaining weak GSM channels. The UE may perform acquisition for a strong GSM channel by (i) detecting for a tone sent on a Frequency Correction Channel (FCCH), (ii) decoding a burst sent on a Synchronization Channel (SCH) to obtain a base transceiver station identity code (BSIC) for a GSM cell, and (iii) decoding a Broadcast Control Channel (BCCH) to obtain System Information Type 2quarter (SI2quarter), Type 3 (SI3), Type 4 (SI4), and/or other messages. The SI2quarter message contains information on measurement and reporting parameters and/or WCDMA neighbor cells. The SI3 and SI4 messages contain information on the transmitting cell and its PLMN. The GSM search may provide a list of zero, one or multiple acquired GSM channels.

The UE may perform a WCDMA search for a frequency band, as follows:

Perform a coarse frequency scan and measure the received signal level at coarse frequencies that are spaced apart by 2 MHz or some other amount,
Identify strong coarse frequencies,
Perform a fine frequency scan for a range of UARFCNs around each strong coarse frequency,
Identify strong UARFCNs,
Attempt acquisition on each strong UARFCN, and
Report a list of acquired UMTS channels.

The UE may operate in an idle mode and camp on a serving GSM cell. The UE may receive a 3G Cell Reselection list and search parameters from the serving GSM cell. The 3G Cell Reselection list may include cells or frequency channels of other RATs. The GSM system may control measurements for reselection of these cells with a Qsearch_I parameter that is broadcast on the BCCH. The Qsearch_I parameter defines a threshold and also indicates whether to perform measurements when an average received signal level (RLA_C) of the serving GSM cell is below or above this threshold. The inter-RAT measurements may be performed less frequently than measurements for GSM cells in order to conserve battery power of the UE.

The UE may be designed such that it can identify and select a new best WCDMA cell on a UMTS channel, which is included in the 3G Cell Reselection list, within 30 seconds after the UE has been activated when there is only one UMTS channel in the list and under good channel conditions. This may be achieved by performing WCDMA searches at a rate of every approximately 30 seconds. However, there are certain operating scenarios in which performing WCDMA searches this frequently may consume significant battery power with low probability of cell reselection. For example, the UE may be far from the serving GSM cell but not far enough to reselect another cell. The UE may perform a WCDMA search every approximately 30 seconds when the RLA_C of the serving GSM cell is below the threshold given by the Qsearch_I parameter. The WCDMA search may be repeated every 30 seconds even if the received signal level for WCDMA is weaker than the received signal level for the serving GSM cell. The UE may thus consume a significant amount of battery power without performing cell reselection.

In an aspect, which may be referred to as search scheme 1, the UE may vary the rate of WCDMA searches based on received signal levels for GSM and WCDMA. The UE may determine the difference between the received signal level for GSM and the received signal level for WCDMA, as follows:

$$\text{RSL\_difference} = \text{GSM\_RSL} - \text{WCDMA\_RSL}. \quad \text{Eq (1)}$$

where
  WCDMA_RSL is the received signal level for WCDMA for a UMTS channel,
  GSM_RSL is the received signal level for the serving GSM cell, and
  RSL_difference is the difference between the received signal levels for GSM and WCDMA.

In equation (1), each received signal level may be given in units of dBm, which is measured power referenced to one milliwatt. The RSL difference may be given in units of decibel (dB).

In one design, the UE may compare the RSL difference against a DTH threshold and may select a rate of WCDMA searches, as follows:

$$\text{Search\_rate} = \begin{cases} \text{Rate 1} & \text{if } \text{RSL\_difference} \leq DTH \\ \text{Rate 2} & \text{if } \text{RSL\_difference} > DTH \end{cases} \quad \text{Eq (2)}$$

where Rate 1 may be every 30 seconds or less, and Rate 2 may be slower than Rate 1.

Figure 2:
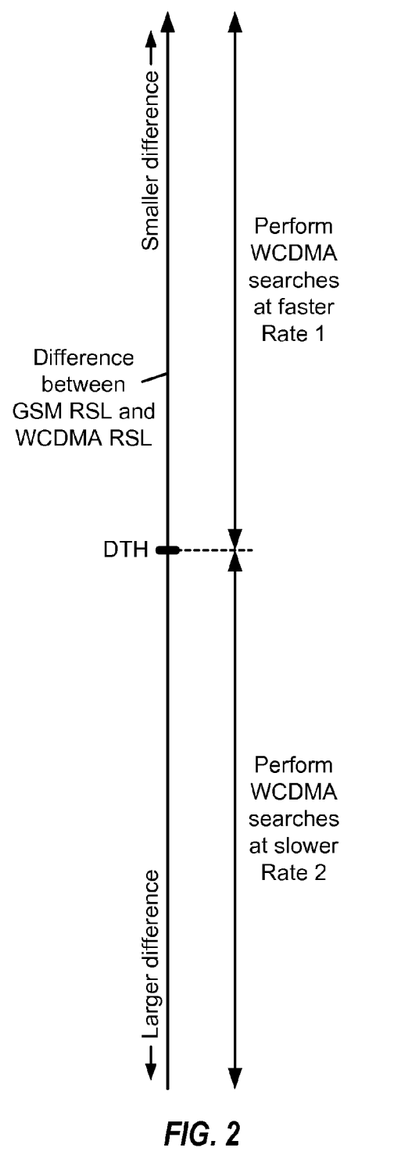
FIGS. 2 and 3 show two designs for selecting the rate of WCDMA searches based on the difference between the received signal levels for GSM and WCDMA.

FIG. 2 shows selection of the rate of WCDMA searches based on the design in equation (2). The UE may perform WCDMA searches at the faster Rate 1 if the WCDMA received signal level is worse than the GSM received signal level by less than the DTH threshold. The UE may perform WCDMA searches at the slower Rate 2 if the WCDMA received signal level is worse than the GSM received signal level by more than the DTH threshold. The DTH threshold may be 2 dB, 3 dB, 5 dB, etc. Rate 2 may be every 60 seconds, 120 seconds, etc.

In another design, the UE may compare the RSL difference against multiple (K) thresholds $DTH_1$ through $DTH_K$ and may select a rate of WCDMA searches, as follows:

$$\text{Search\_rate} = \begin{cases} \text{Rate 1} & \text{if } \text{RSL\_difference} \leq DTH_1 \\ \vdots & \vdots \\ \text{Rate } K & \text{if } DTH_{K-1} < \text{RSL\_difference} \leq DTH_K \\ \text{Rate } K+1 & \text{if } \text{RSL\_difference} > DTH_K \end{cases} \quad \text{Eq (3)}$$

where Rate 1<Rate 2< . . . <Rate K<Rate K+1.

Figure 3:
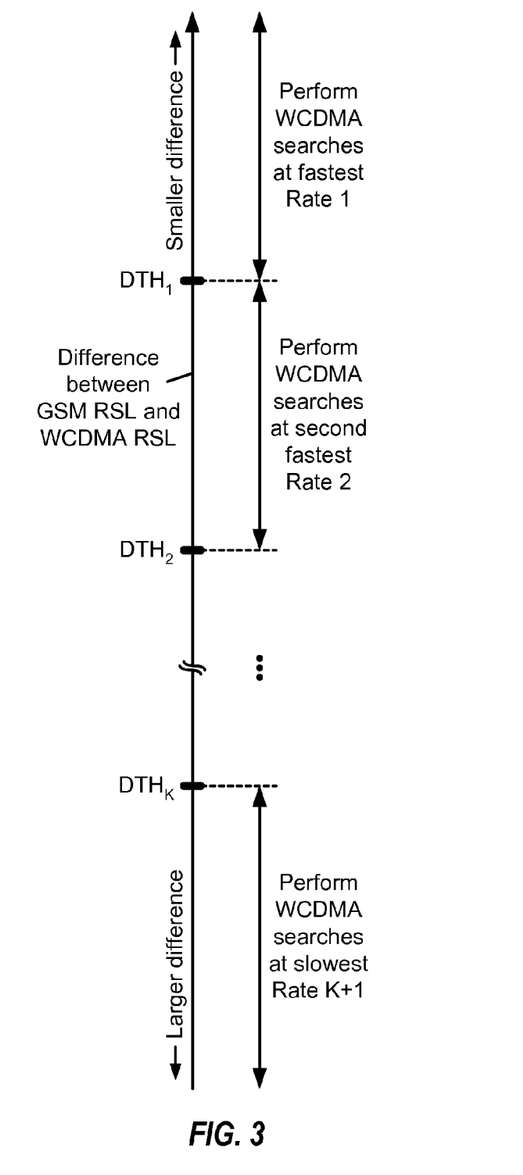

FIG. 3 shows selection of the rate of WCDMA searches based on the design in equation (3). K+1 ranges may be defined with the K thresholds $DTH_1$ through $DTH_K$. In general, K may be any value greater than one. Each range may be associated with a different search rate. Progressively slower search rates may be used for progressively larger difference between the GSM received signal level and the WCDMA received signal level. The UE may determine which range the RSL difference falls within and may then perform WCDMA searches at the rate associated with this range. For example, K may be equal to two, and two thresholds of $DTH_1=2$ dB and $DTH_2=5$ dB (or some other values) may be used. The UE may perform WCDMA searches at a rate of every 30 seconds when the RSL difference is less than 2 dB, at a rate of every 60 seconds when the RSL difference is between 2 and 5 dB, and at a rate of every 120 seconds when the RSL difference is greater than 5 dB. Other threshold values and other rates may also be used.

In yet another design, the UE may compute the rate of WCDMA searches based on a function of the RSL difference, as follows:

$$\text{Search rate} = f(\text{RSL\_difference}), \quad \text{Eq (4)}$$

where $f(\ )$ may be any suitable function. For example, the rate may be computed as:

$$\text{Search rate} = K^* \text{RSL\_difference} + D. \quad \text{Eq (5)}$$

where D is a minimum value and K is a scaling factor. For example, D may be equal to 30 seconds, and K may be equal to 1, 2, 4, 8, etc. The rate of WCDMA searches may also be determined based on other functions.

In yet another design, the UE may perform WCDMA searches if the RSL difference is less than an STH threshold and may skip WCDMA searches if the RSL difference is greater than the STH threshold. In yet another design, the UE may compare the RSL difference against multiple thresholds, skip WCDMA searches if the RSL difference is greater than the largest threshold, perform WCDMA searches if the RSL difference is less than the largest threshold, and select the rate of WCDMA searches based on which range the RSL difference falls within.

In another aspect, which may be referred to as search scheme 2, the UE may control certain aspects of WCDMA searches by considering the frequency bands for GSM and WCDMA. In a multi-RAT deployment, GSM and WCDMA cells are typically co-located at the same cell sites, share the same base station towers, but operate on different frequency bands. The path loss from a cell to the UE may be proportional to frequency raised to the power of L, where L is a path loss coefficient that may be dependent on the wireless environment. L may be equal to two or greater. If a GSM signal is transmitted on frequency F1 and a WCDMA signal is transmitted on frequency F2 from the same cell site or observe similar propagation conditions, then a ratio of the path loss for the GSM signal to the path loss for the WCDMA signal may be expressed as:

$$Atten = \left(\frac{F2}{F1}\right)^L \equiv \frac{GSM\_RSL}{WCDMA\_RSL}, \qquad Eq(6)$$

where Atten is the path loss ratio for GSM to WCDMA and is in linear unit.

If F2>F1, then the WCDMA signal will be weaker than the GSM signal, with the amount being determined by the values of F1, F2 and L. For example, if the GSM signal is transmitted at F1=1800 MHz, the WCDMA signal is transmitted at F2=2100 MHz, and L=2, then the path loss for the WCDMA signal may be $(2100/1800)^2=1.36$ times the path loss for the GSM signal. Since received signal level is inversely related to path loss, the received signal level of the WCDMA signal would be approximately 27% (or 1−1/1.36) below the received signal level of the GSM signal. This example assumes an inverse square relationship between path loss and signal frequency. Under non-line-of-sight conditions, the path loss coefficient L may be larger than 2, and the WCDMA received signal level may be even weaker than the value given above. If the WCDMA received signal level is weaker than the GSM received signal level assuming a path loss coefficient of two, then it may be safe to assume that the WCDMA received signal level will be weaker than the GSM received signal level under more realistic propagation conditions.

In one design, the UE may determine whether or not to perform WCDMA searches based on knowledge of the frequency bands for GSM and WCDMA and the received signal level of the serving GSM cell. The UE may determine the Atten factor based on the frequency bands for GSM and WCDMA, as shown in equation (6). The UE may then estimate the received signal level of a WCDMA signal on the frequency band for WCDMA, as follows:

$$Estimated\_WCDMA\_RSL = GSM\_RSL - Atten\_dB \qquad Eq(7)$$

where Atten_dB is in units of dB and may be derived from Atten.

The UE may determine whether or not to perform WCDMA searches based on the estimated WCDMA received signal level, as follows:

$$If\ (Estimated\_WCDMA\_RSL > WTH) \qquad Eq(8)$$

Then perform WCDMA search,
Else skip WCDMA search.

Figure 4:
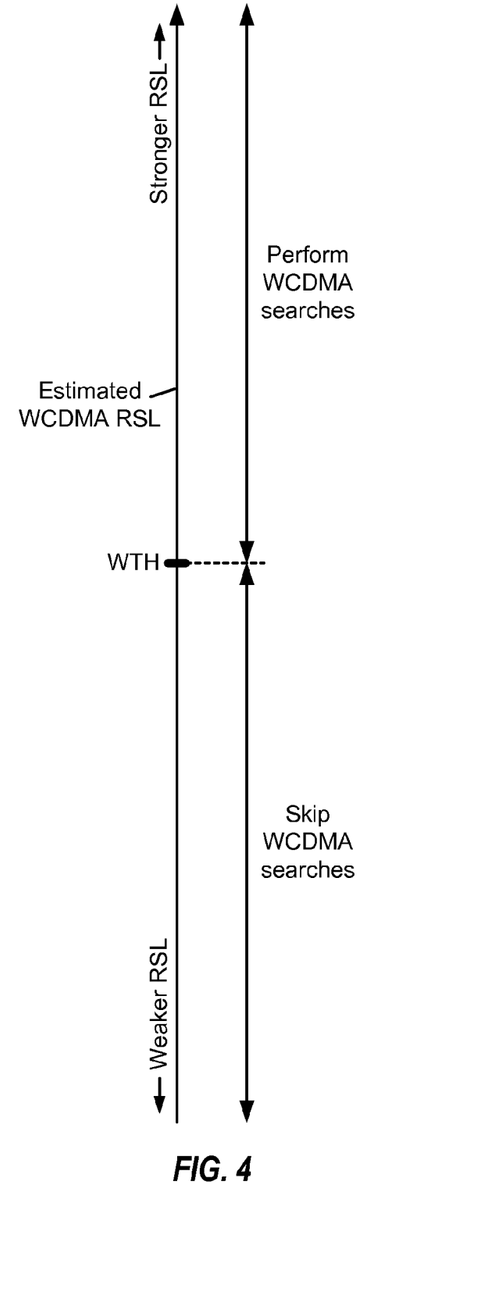
FIGS. 4 and 5 show two designs for controlling WCDMA searches based on frequency bands for GSM and WCDMA.

FIG. 4 shows determination of whether or not to perform WCDMA searches based on the design in equation (8). The UE may compare the estimated WCDMA received signal level against a WTH threshold. The UE may perform WCDMA searches if the estimated WCDMA received signal level is greater than the WTH threshold and may skip WCDMA searches otherwise.

In another design, the UE may determine a rate of WCDMA searches based on the estimated WCDMA received signal level. The UE may compare the estimated WCDMA received signal level against M thresholds $WTH_1$ through $WTH_M$, where in general M≥1. The UE may select the rate of WCDMA searches based on the comparison result, as follows:

$$Search\_rate = \begin{cases} Rate\ 1 & if\ Estimated\_WCDMA\_RSL \geq WTH_1 \\ \vdots & \vdots \\ Rate\ M & if\ WTH_{M-1} > Estimated\_WCDMA\_RSL \geq WTH_M \\ Rate\ M+1 & if\ Estimated\_WCDMA\_RSL < WTH_M \end{cases} \qquad Eq(9)$$

where Rate 1<Rate 2< ... <Rate M<Rate M+1.

Figure 5:
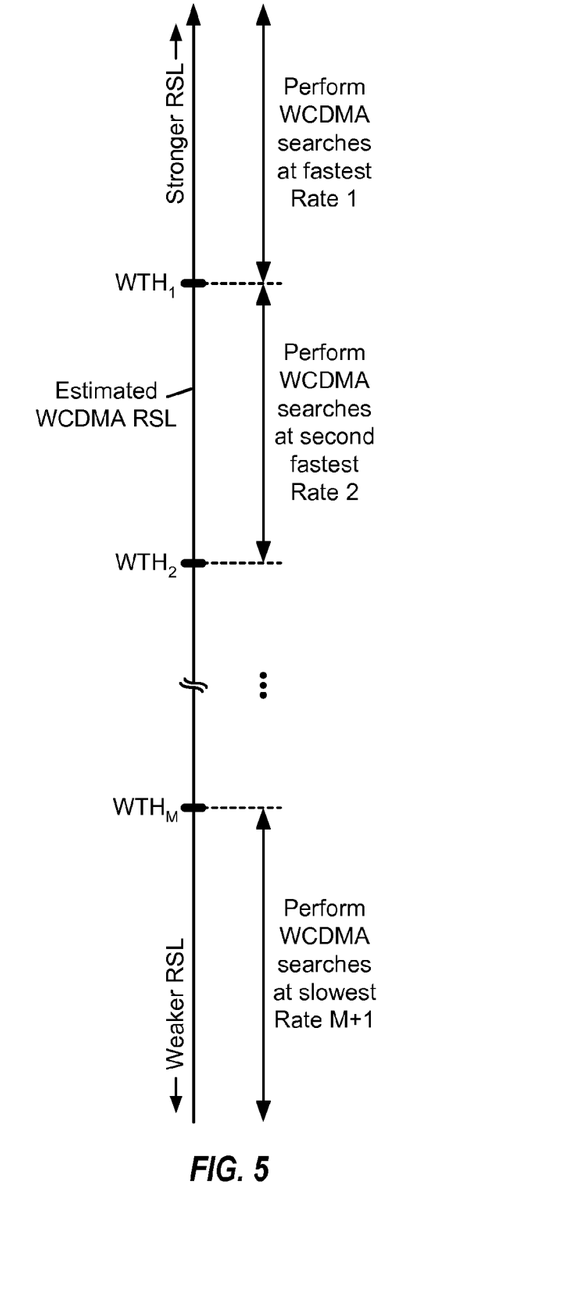

FIG. 5 shows selection of the rate of WCDMA searches based on the design in equation (9). M+1 ranges may be defined with the M thresholds $WTH_1$ through $WTH_M$. In general, M may be any value one or greater. Each range may be associated with a different search rate. Progressively slower search rates may be used for progressively weaker estimated WCDMA received signal level. The UE may determine which range the estimated WCDMA received signal level falls within and may then perform WCDMA searches at the rate associated with this range. In general, the UE may perform WCDMA searches at a slower rate when the estimated WCDMA received signal level is weak and may perform WCDMA searches at a faster rate when the estimated WCDMA received signal level is strong.

In yet another design, the UE may implement a combination of the two designs described above. The UE may compare the estimated WCDMA received signal level against multiple thresholds, skip WCDMA searches if the estimated WCDMA received signal level is worse than the lowest threshold, perform WCDMA searches if the estimated WCDMA received signal level is better than the lowest threshold, and select the rate of WCDMA searches based on which range the estimated WCDMA received signal level falls within.

The factor Atten_dB is a fixed value when the frequency bands for GSM and WCDMA are known. The UE may thus directly compare the measured GSM received signal level against a set of thresholds $GTH_1$ through $GTH_M$, where $GTH_m = WTH_m + Atten\_dB$, for m=1, ..., M. This avoids the need to compute the estimated WCDMA received signal level.

In yet another design, the UE may select one or more frequency bands to perform WCDMA searches based on the frequency band and the received signal level of the serving GSM cell. The UE may determine Atten(k) for each UMTS band k of interest based on the frequency band of the serving GSM cell. The UE may then determine whether or not to search each UMTS band based on Atten(k) for that UMTS band and the GSM received signal level.

In yet another design, the UE may determine an order of searching multiple frequency bands based on the expected amount of attenuation for each frequency band. The UE may determine Atten(k) for each UMTS band k of interest based on the frequency band of the serving GSM cell. The UE may then search for the UMTS band with the lowest Atten(k) value first, then the UMTS band with the second lowest Atten(k) value next, etc.

For search scheme 2, the UE may use frequency band information for GSM and WCDMA as well as the GSM received signal level to determine whether or not to perform WCDMA searches, the rate of WCDMA searches, which frequency band(s) to perform WCDMA searches, and the order in which the frequency band(s) may be searched. The UE may also control other aspects of WCDMA searches based on the GSM and WCDMA band information and the GSM received signal level.

In one design, the UE may implement search scheme 1 and/or 2 upon entering the idle mode. In another design, the UE may implement search scheme 1 and/or 2 only if one or more conditions are satisfied. For example, the UE may implement search scheme 1 and/or 2 if a predetermined number of most recent WCDMA searches failed to produce a suitable WCDMA cell, if cell reselection is not performed within the most recent predetermined number of seconds, etc. The condition(s) may ensure that the UE is operating in a stable environment before reducing the number of WCDMA searches.

In one design, the UE may disable search schemes 1 and 2 based on certain overrule conditions. For example, the UE may revert back to performing WCDMA searches every approximately 30 seconds if the GSM received signal level falls below a low threshold, if the UE detects rapidly changing channel conditions (e.g., wide fluctuations in WCDMA received signal levels on different UMTS channels), etc. These overrule conditions may allow the UE to more quickly perform cell reselection to a better cell.

Figure 6:
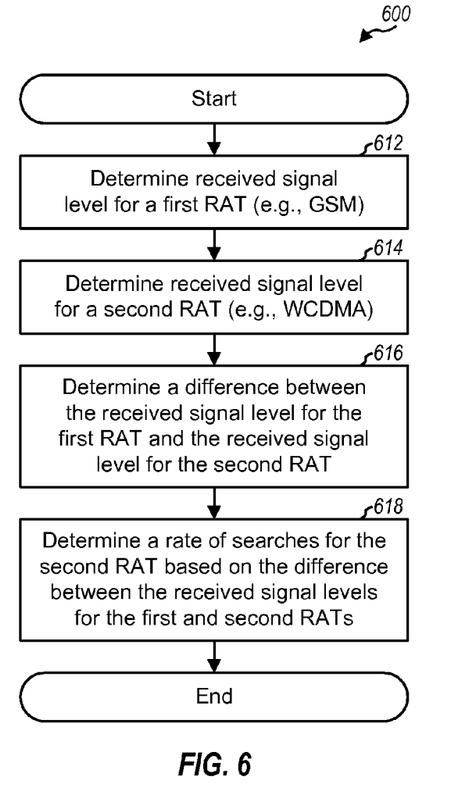
FIG. 6 shows a process for performing searches based on received signal levels for two RATs.

FIG. 6 shows a design of a process 600 for performing searches based on search scheme 1. Process 600 may be performed by UE 150 or some other device. The UE may determine received signal level for a first RAT (e.g., GSM or some other RAT) (block 612). The UE may operate in an idle mode with a serving cell in the first RAT and may use the received signal level of the serving cell as the received signal level for the first RAT. The UE may determine received signal level for a second RAT (e.g., WCDMA or some other RAT) (block 614). The received signal level for the second RAT may be a measurement for a specific frequency channel. The UE may determine a difference between the received signal level for the first RAT and the received signal level for the second RAT (block 616). The UE may then determine a rate of searches for the second RAT based on the difference between the received signal levels for the first and second RATs (block 618).

In one design, the UE may select a first rate if the difference is less than a threshold and may select a second rate slower than the first rate if the difference is greater than the threshold. In another design, the UE may compare the difference against multiple thresholds for multiple ranges, with each range being associated with a different search rate. The UE may then select a search rate associated with a range within which the difference falls. For both design, the UE may use the selected rate as the rate of searches for the second RAT. In yet another design, the UE may determine the rate of searches for the second RAT based on a function of the difference.

In one design, the UE may select a predetermined rate as the rate of searches for the second RAT until at least one condition is satisfied. After the at least one condition is satisfied, the UE may select one of multiple possible rates based on the difference and may use the selected rate as the rate of searches for the second RAT. The at least one condition may be satisfied if a predetermined number of most recent searches for the second RAT is unsuccessful, if cell reselection is not performed within a predetermined number of seconds, etc. In one design, the UE may select the fastest rate among all possible rates if the received signal level for the first RAT is below a low threshold.

Figure 7:
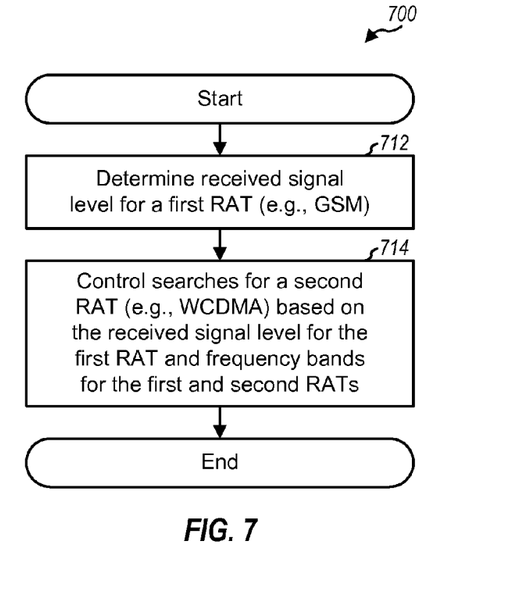
FIG. 7 shows a process for controlling searches based on frequency bands for two RATs.

FIG. 7 shows a design of a process 700 for performing searches based on search scheme 2. Process 700 may be performed by UE 150 or some other device. The UE may determine received signal level for a first RAT (e.g., GSM or some other RAT) (block 712). The UE may control searches for a second RAT (e.g., WCDMA or some other RAT) based on the received signal level for the first RAT and frequency bands for the first and second RATs (block 714).

For block 714, the UE may determine a factor indicative of the difference between the path loss for the first RAT and the path loss for the second RAT based on the frequency bands for the first and second RATs, e.g., as shown in equation (6). The UE may then control searches for the second RAT based on this factor and the received signal level for the first RAT.

In one design, the UE may determine whether to perform or skip searches for the second RAT based on the received signal level for the first RAT and the frequency bands for the first and second RATs. In another design, the UE may determine a rate of searches for the second RAT based on the received signal level for the first RAT and the frequency bands for the two RATs. In yet another design, the UE may select at least one frequency band among multiple frequency bands for the second RAT based on the received signal level and frequency band for the first RAT and the multiple frequency bands for the second RAT. The UE may then perform searches for the second RAT for only the at least one frequency band. In yet another design, the UE may determine an order of multiple frequency bands for the second RAT and may then perform searches for the second RAT for the multiple frequency bands, one frequency band at a time and in accordance with the determined order. The UE may also control searches for the second RAT in other manners.

The techniques described herein may reduce power consumption by reducing the number of WCDMA searches that are unlikely to result in cell reselection. In an unlikely scenario in which a WCDMA cell is better than the serving GSM cell, the cell reselection to this WCDMA cell may be delayed due to less frequent WCDMA searches. However, the savings in battery power should justify the tradeoff with performance, especially if the UE is in the idle mode when the rate of WCDMA searches is reduced. In one UE design, the amount of current consumed in the idle may be reduced by (i) about 5% when WCDMA searches are performed every 60 seconds instead of every 30 seconds and (ii) about 7% when WCDMA searches are performed every 120 seconds. This may extend standby time by about 5% and 7%. Further improvements in standby time may be achieved by further reducing the rate of WCDMA searches. The techniques may be especially beneficial when the UE is located in a ring that is sufficiently far from the serving GSM cell to trigger inter-RAT measurement but not far enough to trigger inter-RAT cell reselection.

For clarity, the search techniques have been specifically described for GSM and WCDMA. In general, the techniques may be used for any number of RATs and any particular RAT. The UE may communicate with a serving cell for one RAT and may control searches for each remaining RAT as described above.

Figure 8:
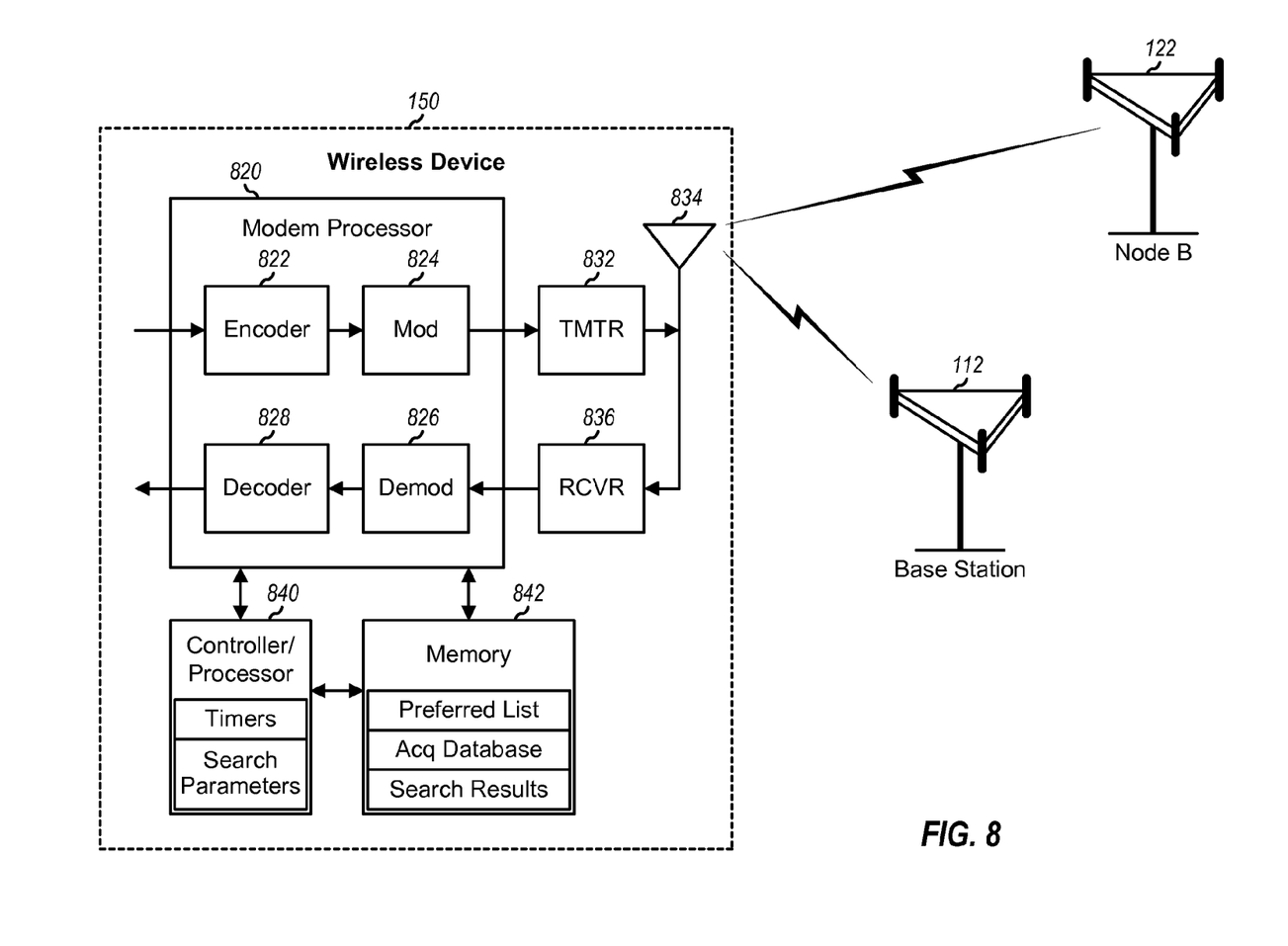
FIG. 8 shows a block diagram of a UE.

FIG. 8 shows a block diagram of a design of UE 150. On the uplink or reverse link, data and signaling to be sent by UE 150 may be processed (e.g., formatted, encoded, and interleaved) by an encoder 822 and further processed (e.g., modulated, channelized, and scrambled) by a modulator (Mod) 824 in accordance with an applicable RAT (e.g., GSM, WCDMA, etc.) to generate output chips. A transmitter (TMTR) 832 may condition (e.g., convert to analog, filter, amplify, and frequency upconvert) the output chips and generate an uplink signal, which may be transmitted via an antenna 834.

On the downlink or forward link, antenna 834 may receive downlink signals transmitted by base stations 112 in GSM system 110 and/or Node Bs 122 in WCDMA system 120 and may provide a received signal. A receiver (RCVR) 836 may condition (e.g., filter, amplify, frequency downconvert, and digitize) the received signal and provide samples. A demodulator (Demod) 826 may process (e.g., descramble, channelize, and demodulate) the samples and provide symbol estimates. A decoder 828 may further process (e.g., deinterleave and decode) the symbol estimates and provide decoded data. Encoder 822, modulator 824, demodulator 826, and decoder 828 may be implemented by a modem processor 820. These units may perform processing in accordance with the RAT (e.g., GSM, WCDMA, etc.) being received. For example, demodulator 826 may perform descrambling with scrambling sequences, despreading with orthogonal codes, and data demodulation for WCDMA. Demodulator 826 may perform matched filtering and equalization for GSM.

A controller/processor 840 may control the operation at UE 150. Controller/processor 840 may implement process 600 in FIG. 6, process 700 in FIG. 7, and/or other processes for the search techniques described herein. Controller/processor 840 may also implement timers to determine when to perform searches. A memory 842 may store data and program codes for UE 150. Controller/processor 840 and/or memory 842 may store search parameters and/or other information for searches for each RAT. Memory 842 may also store a neighbor list (e.g., a 3G Cell Reselection list), a preferred list of systems or PLMNs, an acquisition (Acq) database, search results, etc.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. An apparatus for wireless communication, comprising:
   at least one processor configured to determine received signal level for a first radio access technology (RAT), to determine received signal level for a second RAT, to determine a difference between the received signal level for the first RAT and the received signal level for the second RAT, and to determine a rate of searches for the second RAT based on the difference between the received signal levels for the first and second RATs, the rate identifying a repetition period for performing the searches; and
   a memory coupled to the at least one processor;

wherein the at least one processor is configured to select one of multiple possible rates based on the difference, and to use the selected rate as the rate of searches for the second RAT.

2. The apparatus of claim 1, wherein the at least one processor is configured to select a first rate if the difference is less than a threshold, to select a second rate slower than the first rate if the difference is greater than the threshold, and to use the selected first or second rate as the rate of searches for the second RAT.

3. The apparatus of claim 1, wherein the at least one processor is configured to compare the difference against multiple thresholds for multiple ranges, each range being associated with a different search rate, and to select a search rate associated with a range within which the difference falls as the rate of searches for the second RAT.

4. The apparatus of claim 1, wherein the at least one processor is configured to determine the rate of searches for the second RAT based on a function of the difference.

5. The apparatus of claim 1, wherein the at least one processor is configured to select a predetermined rate as the rate of searches for the second RAT until at least one condition is satisfied, and to select one of multiple possible rates based on the difference as the rate of searches for the second RAT after the at least one condition is satisfied.

6. The apparatus of claim 5, wherein the at least one condition is satisfied if a predetermined number of most recent searches for the second RAT is unsuccessful, or if cell reselection is not performed within a predetermined number of seconds, or both.

7. The apparatus of claim 1, wherein the at least one processor is configured to select a fastest rate among all possible rates for searches for the second RAT if the received signal level for the first RAT is below a low threshold.

8. The apparatus of claim 1, wherein the at least one processor is configured to operate in an idle mode with a serving cell in the first RAT, and to use received signal level of the serving cell as the received signal level for the first RAT.

9. The apparatus of claim 1, wherein the first RAT is Global System for Mobile Communications (GSM) and the second RAT is Wideband Code Division Multiple Access (WCDMA).

10. A method for wireless communication, comprising:
determining received signal level for a first radio access technology (RAT);
determining received signal level for a second RAT;
determining a difference between the received signal level for the first RAT and the received signal level for the second RAT; and
determining a rate of searches for the second RAT based on the difference between the received signal levels for the first and second RATs, the rate identifying a repetition period for performing the searches;
wherein the determining the rate of searches comprises selecting one of multiple possible rates based on the difference, and using the selected rate as the rate of searches for the second RAT.

11. The method of claim 10, wherein the determining the rate of searches comprises
comparing the difference against at least one threshold for multiple ranges, each range being associated with a different search rate, and
selecting a search rate associated with a range within which the difference falls as the rate of searches for the second RAT.

12. The method of claim 10, wherein the determining the rate of searches comprises
selecting a predetermined rate as the rate of searches for the second RAT until at least one condition is satisfied, and
selecting one of multiple possible rates based on the difference as the rate of searches for the second RAT after the at least one condition is satisfied.

13. The method of claim 10, further comprising:
selecting a fastest rate among all possible rates for searches for the second RAT if the received signal level for the first RAT is below a low threshold.

14. An apparatus for wireless communication, comprising:
means for determining received signal level for a first radio access technology (RAT);
means for determining received signal level for a second RAT;
means for determining a difference between the received signal level for the first RAT and the received signal level for the second RAT; and
means for determining a rate of searches for the second RAT based on the difference between the received signal levels for the first and second RATs, the rate identifying a repetition period for performing the searches;
wherein the means for determining the rate of searches comprises means for comparing the difference against at least one threshold for multiple ranges,
each range being associated with a different search rate, and means for selecting a search rate associated with a range within which the difference falls as the rate of searches for the second RAT.

15. The apparatus of claim 14, further comprising:
means for selecting a fastest rate among all possible rates for searches for the second RAT if the received signal level for the first RAT is below a low threshold.

16. A non-transitory computer program product, comprising:
a computer-readable medium comprising:
code for causing at least one computer to determine received signal level for a first radio access technology (RAT);
code for causing at least one computer to determine received signal level for a second RAT;
code for causing the at least one computer to determine a difference between the received signal level for the first RAT and the received signal level for the second RAT; and
code for causing the at least one computer to determine a rate of searches for the second RAT based on the difference between the received signal levels for the first and second RATs, the rate identifying a repetition period for performing the searches;
the computer-readable medium further comprising:
code for causing the at least one computer to compare the difference against at least one threshold for multiple ranges, each range being associated with a different search rate; and
code for causing the at least one computer to select a search rate associated with a range within which the difference falls as the rate of searches for the second RAT.

17. The non-transitory computer program product of claim 16, the computer-readable medium further comprising:
code for causing the at least one computer to select a fastest rate among all possible rates for searches for the second RAT if the received signal level for the first RAT is below a low threshold.

18. An apparatus for wireless communication, comprising:
at least one processor configured to determine received signal level for a first radio access technology (RAT), and to control searches for a second RAT based on the received signal level for the first RAT and frequency bands for the first and second RATs, the control including a repetition period for performing the searches; and
a memory coupled to the at least one processor;
wherein the at least one processor is configured to select at least one frequency band among multiple frequency bands for the second RAT based on the received signal level and frequency band for the first RAT and the multiple frequency bands for the second RAT, and to perform searches for the second RAT for only the at least one frequency band.

19. The apparatus of claim 18, wherein the at least one processor is configured to determine a factor indicative of a difference between path loss for the first RAT and path loss for the second RAT based on the frequency bands for the first and second RATs, and to control searches for the second RAT based on the factor and the received signal level for the first RAT.

20. The apparatus of claim 18, wherein the at least one processor is configured to determine whether to perform or skip searches for the second RAT based on the received signal level for the first RAT and the frequency bands for the first and second RATs.

21. The apparatus of claim 18, wherein the at least one processor is configured to determine a rate of searches for the second RAT based on the received signal level for the first RAT and the frequency bands for the first and second RATs.

22. The apparatus of claim 18, wherein the at least one processor is configured to determine an order of multiple frequency bands for the second RAT, and to perform searches for the second RAT for the multiple frequency bands, one frequency band at a time and in accordance with the determined order.

23. A method for wireless communication, comprising:
determining received signal level for a first radio access technology (RAT); and
controlling searches for a second RAT based on the received signal level for the first RAT and frequency bands for the first and second RATs, the controlling including a repetition period for performing the searches;
wherein the controlling searches for the second RAT comprises
selecting at least one frequency band among multiple frequency bands for the second RAT based on the received signal level and frequency band for the first RAT and the multiple frequency bands for the second RAT, and
performing searches for the second RAT for only the at least one frequency band.

24. The method of claim 23, wherein the controlling searches for the second RAT comprises
determining whether to perform or skip searches for the second RAT based on the received signal level for the first RAT and the frequency bands for the first and second RATs.

25. The method of claim 23, wherein the controlling searches for the second RAT comprises
determining a rate of searches for the second RAT based on the received signal level for the first RAT and the frequency bands for the first and second RATs.

26. The method of claim 23, wherein the controlling searches for the second RAT comprises
determining an order of multiple frequency bands for the second RAT, and
performing searches for the second RAT for the multiple frequency bands, one frequency band at a time and in accordance with the determined order.

* * * * *